United States Patent
Cheng

(10) Patent No.: US 9,947,465 B2
(45) Date of Patent: Apr. 17, 2018

(54) MAGNETIC ASSEMBLY PACKAGING PROCESS

(71) Applicant: Mag. Layers Scientific-Technics Co., Ltd., Hsinchu County (TW)

(72) Inventor: Ching-Yuan Cheng, Pingjhen (TW)

(73) Assignee: MAG. LAYERS SCIENTIFIC-TECHNICS CO., LTD., Hsinchu County (TW)

( * ) Notice: Subject to any disclaimer, the term of this patent is extended or adjusted under 35 U.S.C. 154(b) by 221 days.

(21) Appl. No.: 14/311,922

(22) Filed: Jun. 23, 2014

(65) Prior Publication Data

US 2015/0371750 A1    Dec. 24, 2015

(51) Int. Cl.
| | |
|---|---|
| H01F 41/02 | (2006.01) |
| H01F 27/06 | (2006.01) |
| H01F 27/02 | (2006.01) |
| H01F 27/32 | (2006.01) |
| H01F 41/00 | (2006.01) |

(Continued)

(52) U.S. Cl.
CPC ........... *H01F 41/02* (2013.01); *H01F 27/022* (2013.01); *H01F 27/027* (2013.01); *H01F 27/06* (2013.01); *H01F 27/292* (2013.01); *H01F 27/324* (2013.01); *H01F 27/327* (2013.01); *H01F 41/005* (2013.01); *H01F 41/0246* (2013.01); *H01F 41/0266* (2013.01); *H01F 41/127* (2013.01); *B29C 33/26* (2013.01); *B29C 33/30* (2013.01); *B29C 33/308* (2013.01); *H01F 2027/065* (2013.01); *Y10T 29/4902* (2015.01); *Y10T 29/49069* (2015.01); *Y10T 29/49071* (2015.01); *Y10T 29/49073* (2015.01)

(58) Field of Classification Search
CPC ...... H01F 27/022; H01F 27/06; H01F 27/027; H01F 27/292; H01F 27/324; H01F 27/327; H01F 41/005; H01F 41/02; H01F 41/0246; H01F 41/0266; H01F 41/127; H01F 2027/065; B29C 33/26; B29C 33/30; B29C 33/308; Y10T 29/4902; Y10T 29/49069; Y10T 29/4907; Y10T 29/49073; Y10T 29/49071
USPC .................................. 336/90, 192, 199, 208
See application file for complete search history.

(56) References Cited

U.S. PATENT DOCUMENTS

| | | | | |
|---|---|---|---|---|
| 2,079,697 A | * | 5/1937 | Ranges | ................. H02G 15/12 174/541 |
| 3,184,719 A | * | 5/1965 | Perkins | ..................... G11C 5/05 29/604 |

(Continued)

FOREIGN PATENT DOCUMENTS

JP    2009267350 A  * 11/2009

*Primary Examiner* — A. Dexter Tugbang
(74) *Attorney, Agent, or Firm* — Bacon & Thomas, PLLC

(57) ABSTRACT

A magnetic assembly packaging process is described. The magnetic assembly packaging process comprises the steps of setting a first substrate and a second substrate in a jig; performing electrical connection of the magnetic component to the first substrate and the second substrate; overlaying the enclosure over the first substrate and the second substrate; overturning the preformed magnetic assembly; and injecting an insulation paste layer between the first substrate and the second substrate. Accordingly, the magnetic assembly packaging process can effectively minimize the manufacturing cost and the volume of the magnetic element through reducing the overall volume of the substrate.

6 Claims, 17 Drawing Sheets

(51) Int. Cl.
*H01F 41/12* (2006.01)
*H01F 27/29* (2006.01)
*B29C 33/30* (2006.01)
*B29C 33/26* (2006.01)

(56) References Cited

U.S. PATENT DOCUMENTS

| | | | | |
|---|---|---|---|---|
| 3,377,699 A * | 4/1968 | Dinella | ............ | H05K 1/056 174/260 |
| 3,525,972 A * | 8/1970 | Kinkaid | ............ | H01R 13/42 439/381 |
| 3,845,435 A * | 10/1974 | Georgopulos | ...... | H02G 15/12 174/522 |
| 4,288,841 A * | 9/1981 | Gogal | ............ | H01L 23/49822 174/534 |
| 6,005,463 A * | 12/1999 | Lint | ............ | H01F 27/027 336/192 |
| 6,225,560 B1 * | 5/2001 | Machado | ............ | H01F 27/027 174/535 |
| 6,320,489 B1 * | 11/2001 | Lu | ............ | H01F 41/005 336/192 |
| 6,375,884 B1 * | 4/2002 | Shikama | ............ | H01F 41/127 264/254 |
| 7,612,641 B2 * | 11/2009 | Jean | ............ | H01F 27/027 336/192 |
| 7,876,573 B2 * | 1/2011 | Motohara | ............ | H05K 1/144 361/770 |
| 8,624,702 B2 * | 1/2014 | MacLennan | ............ | H01F 27/08 336/210 |
| 8,659,383 B2 * | 2/2014 | Cheng | ............ | H01F 27/292 336/200 |
| 8,845,367 B2 * | 9/2014 | Gutierrez | ............ | H01F 27/027 439/620.01 |
| 2009/0051473 A1 * | 2/2009 | MacLennan | ............ | H01F 3/14 336/82 |
| 2012/0262265 A1 * | 10/2012 | Lo | ............ | H01F 27/022 336/83 |

* cited by examiner

US 9,947,465 B2

MAGNETIC ASSEMBLY PACKAGING PROCESS

BACKGROUND OF THE INVENTION

Field of the Invention

The present invention relates to a magnetic assembly, more particularly to a magnetic assembly having a first substrate and a second substrate formed as a pair and having a magnetic element provided between the two substrates.

Brief Description of Prior Arts

The interior of electronic device and equipment for communication and transmission is formed by a plurality of active components and passive components. The passive components mentioned here are, for example, magnetic components, resistors and so on. The magnetic component, such as transformer, inductor, has the property of generating a magnetic field upon the introduction of electric current. As electronic equipments are in pursuit of miniaturization nowadays, the miniaturization of the magnetic components is imperative too. Further, in order that the magnetic components can be easily fixed on the circuit board, the magnetic components are packaged as similar to the configuration of integrated chips. Referring to U.S. Pat. No. 6,937,454 B2 entitled "Integrated device providing overcurrent and over-voltage protection and common-mode filtering to data bus interface", a magnetic component (called electronic component herein) having its overall volume effectively reduced is disclosed. Referring to FIG. 1, the conventional magnetic component 10 is formed by a substrate 101 and a magnetic component 102. The magnetic component 102 is electrically connected on the substrate 101. Apart from the places with electrical connection, the unused block B of the substrate 101 occupies a certain proportion of its overall area. Therefore, when taking the manufacturing cost into serious consideration, the block B should be discarded to reduce raw material required for manufacturing the substrate 101 so as to avoid wasting the raw material for production. Referring to FIG. 2, the magnetic assembly 10 is usually fixed on a circuit board 11 by surface mount technology (SMT) process, so that the magnetic assembly 10 can be precisely connected to an electrical connection portion 111 of the circuit board 11. However, the solder liquid used in the SMT process is often unable to enter smoothly in between the substrate 101 and the electrical connection portion 111, so that the magnetic assembly 10 is unable to be attached to the circuit board 11 firmly. Therefore, the structure of conventional magnetic assembly 10 still has room to be improved further.

SUMMARY OF THE INVENTION

In view of the above problems, the main object of this invention is to provide a magnetic assembly which can facilitate the reduction of the area of substrate so as to shrink the dimension of product, and which is easy to be loaded for printed circuit board assembly (PCBA) by SMT process.

In order to achieve above objects, the magnetic assembly of the present invention is mainly composed of a first substrate and a second substrate formed as a pair and a magnetic component, in which the first substrate and the second substrate are spaced with an interval. The magnetic component is assembled between the first substrate and the second substrate. After the magnetic component is assembled, an enclosure is further assembled over the first substrate and the second substrate to completely overlay the magnetic component, so as to form a magnetic assembly.

Further, one side edge of each of the first substrate and the second substrate form one or a plurality of guide groove(s) with breach(es), and each guide groove is filled with conductive metal therein so that a first electrode formed on one plane of each of the two substrates is electrically connected with the conductive metal. Further, when the magnetic assembly is loaded for PCBA by SMT process, as the conductive metal is exposed externally on the side edge of each substrate, the solder liquid can be attached effectively and rapidly among the first substrate, the second substrate and a circuit board by solder wicking principle, so that the magnetic assembly can be disposed firmly on the circuit board so as to accomplish the electrical connection between the magnetic assembly and the circuit board. Therefore, this invention can effectively reduce the manufacturing cost and the volume of the substrate through shrinking the overall dimension of the substrate.

BRIEF DESCRIPTION OF ACCOMPANYING DRAWINGS

The present invention will be better understood by the detailed description of a preferred embodiment with reference to the accompanied drawings, in which.

DETAILED DESCRIPTION OF PREFERRED EMBODIMENTS

The technical contents, objects and effects of the present invention will become more apparent by the detailed description of some preferred embodiments in conjunction with the accompanied drawings.

Figure 1:
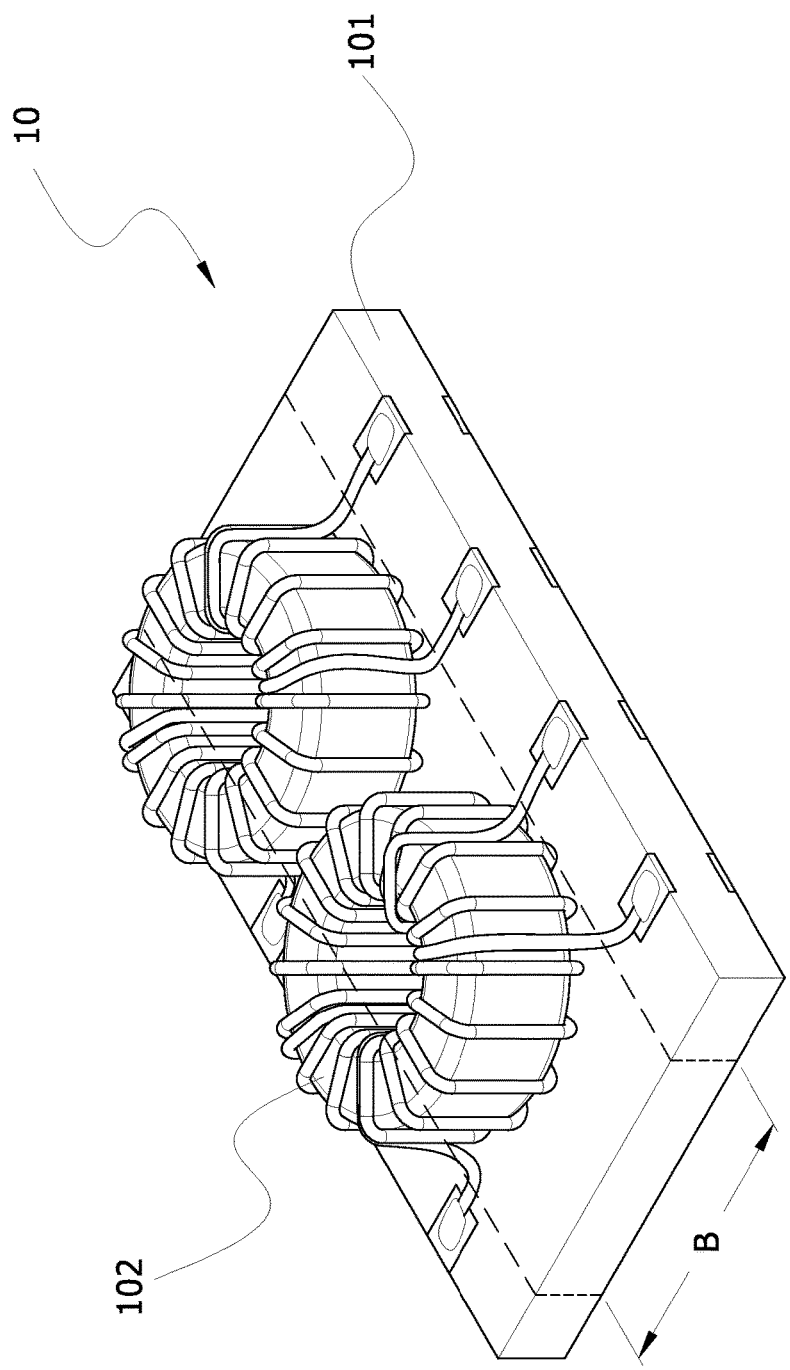
FIG. 1 is a conventional electrical assembly.
Figure 2:
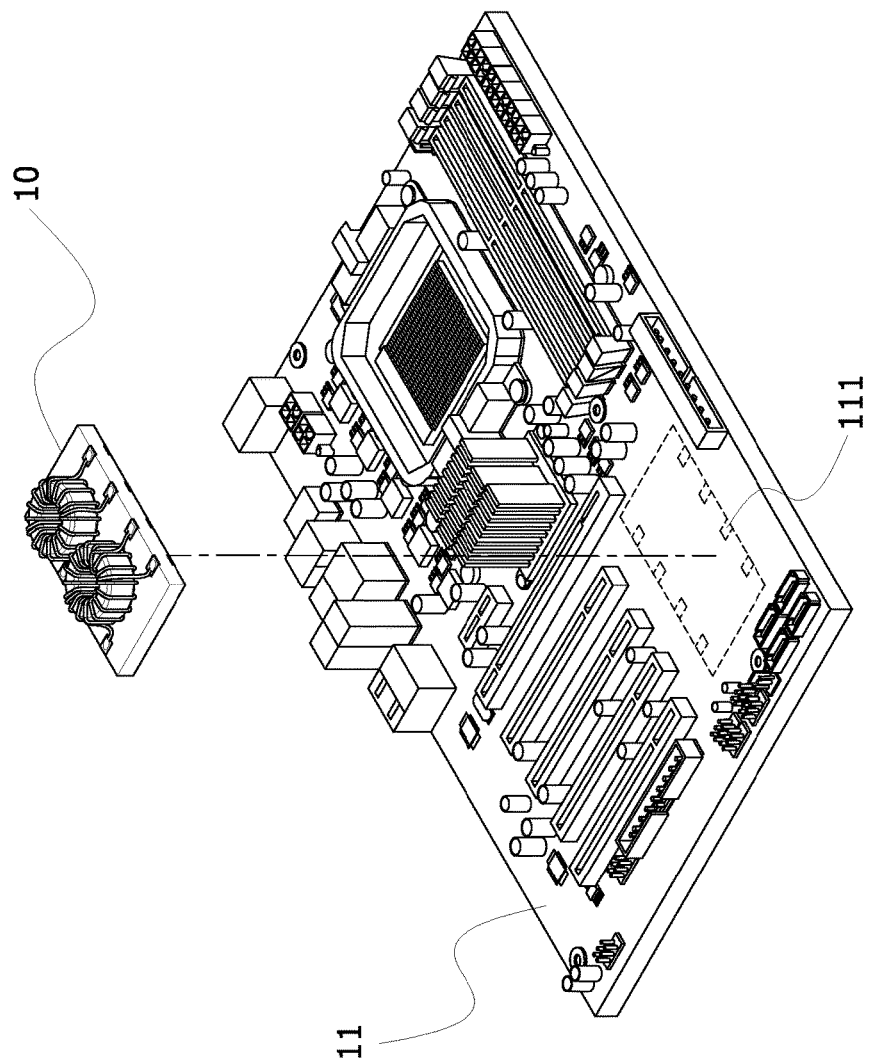
FIG. 2 is a schematic view showing the electrical connection of the conventional electrical assembly.
Figure 3:
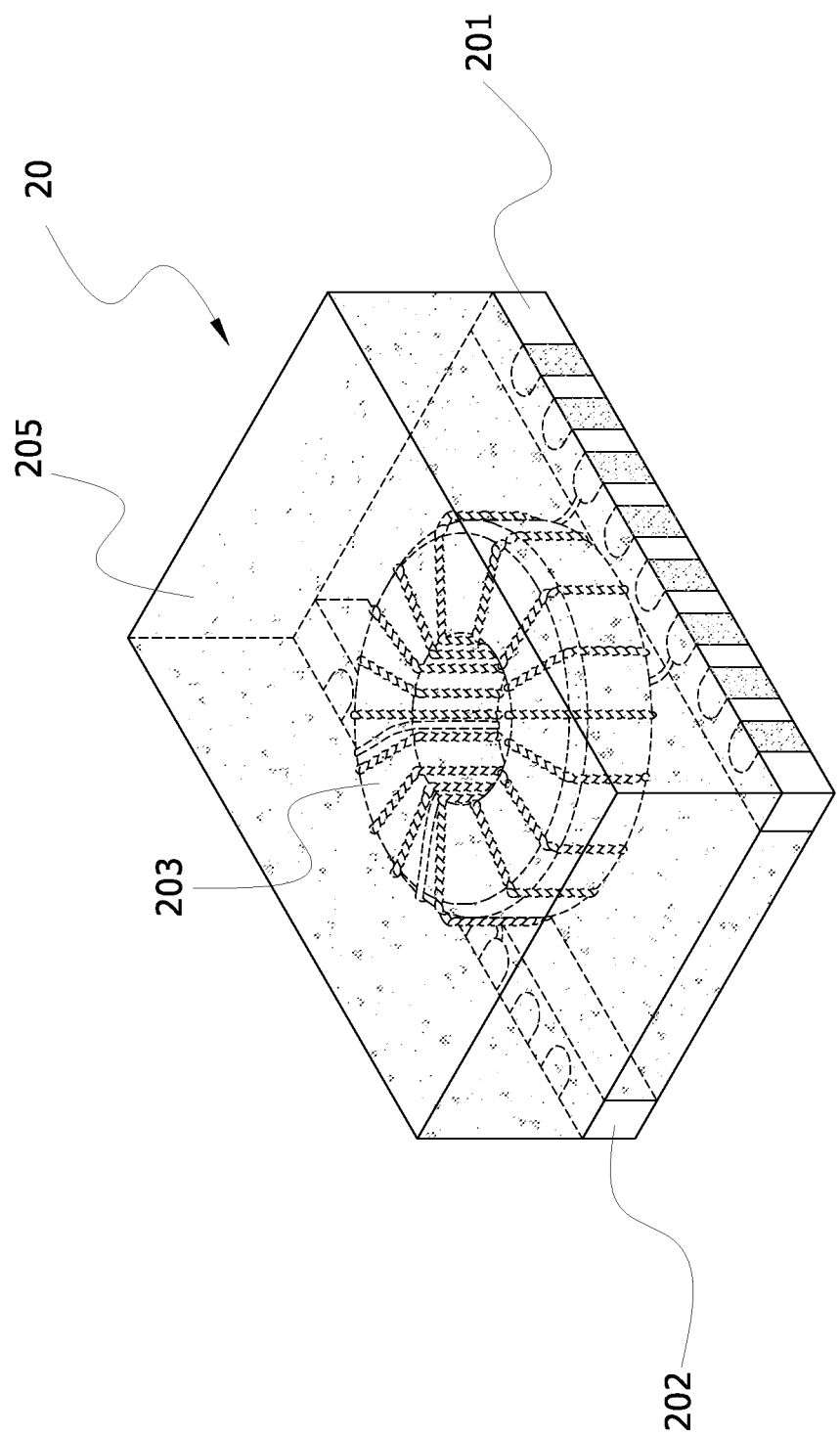
FIG. 3 is a perspective view showing the appearance of the present invention.

Referring to FIG. 3, the magnetic assembly 20 of the present invention is mainly composed of a first substrate 201 and a second substrate 202 formed as a pair and a magnetic component 203. The first substrate 201 and the second substrate 202 are elongate substrates of the same structure, while the magnetic component 203 is disposed between the two substrates (201, 202) and is electrically connected to both substrates (201, 202). An enclosure 205 is covered over the two substrates (201, 202) so as to overlay the magnetic component 203. The side edge of each of the two substrates (201, 202) is exposed externally so as to facilitate attachment to a circuit board through reflowing process.

Figure 4:
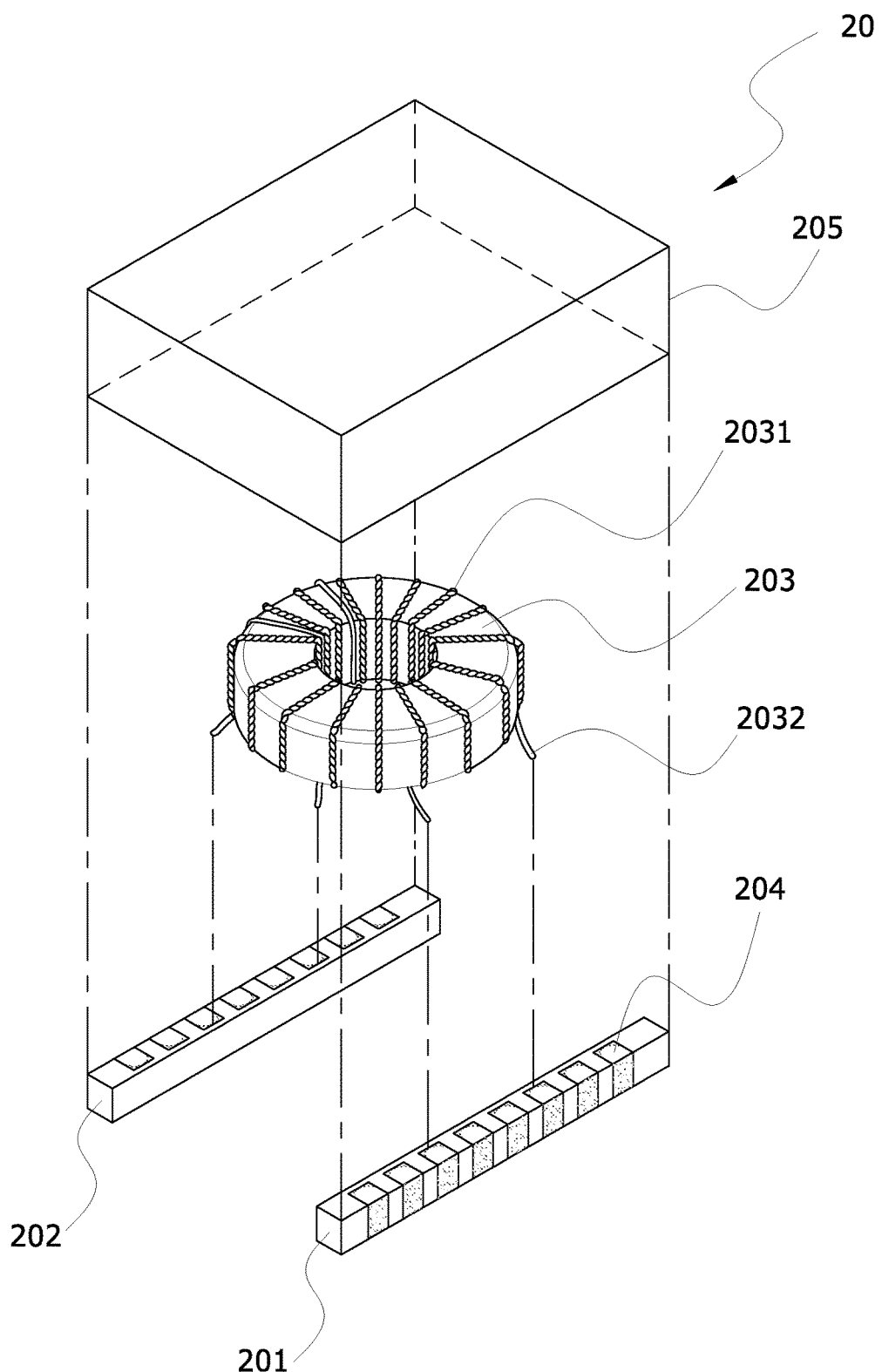
FIG. 4 is a schematic view (I) showing the composition of the present invention.

Referring to FIG. 4, in packaging the magnetic assembly 20, a first electrode 204 is assembled on one plane (i.e., either the top face or the bottom face) of each of the two substrates (201, 202). Further, the magnetic component 203 is provided between the first substrate 201 and the second substrate 202. The magnetic component 203 is wrapped with a conductive winding 2031, and the end of the conductive winding 2031 forms more than one electrical connection terminals 2032 which respectively complete electrical connection with the first electrodes 204. In this figure, the magnetic component 203 is exemplified to be wrapped with a single conductive winding 2031 only, but it is not limited to this case. It is specially stated here that the magnetic component 203 can also be wrapped with a plurality of conductive windings 2031. Furthermore, when the magnetic assembly 20 is connected to a circuit board to form electrical connection, the magnetic assembly 20 can transfer electricity to the magnetic component 203 through the first electrodes 204. The number of first electrodes 204 can be changed according to the quantities of the electrical connection terminals 2032 of the conductive windings 2031 (larger than or equal to the quantities of the electrical connection terminals). Principally, one conductive winding 2031 pairs up with one first electrode 204 in implementation, but it is not limited to this case. The magnetic assembly 20 of the present invention can also has a plurality of magnetic components 203, and the number of first electrodes 204 can be changed according to the quantities of the magnetic components 203.

Figure 5:
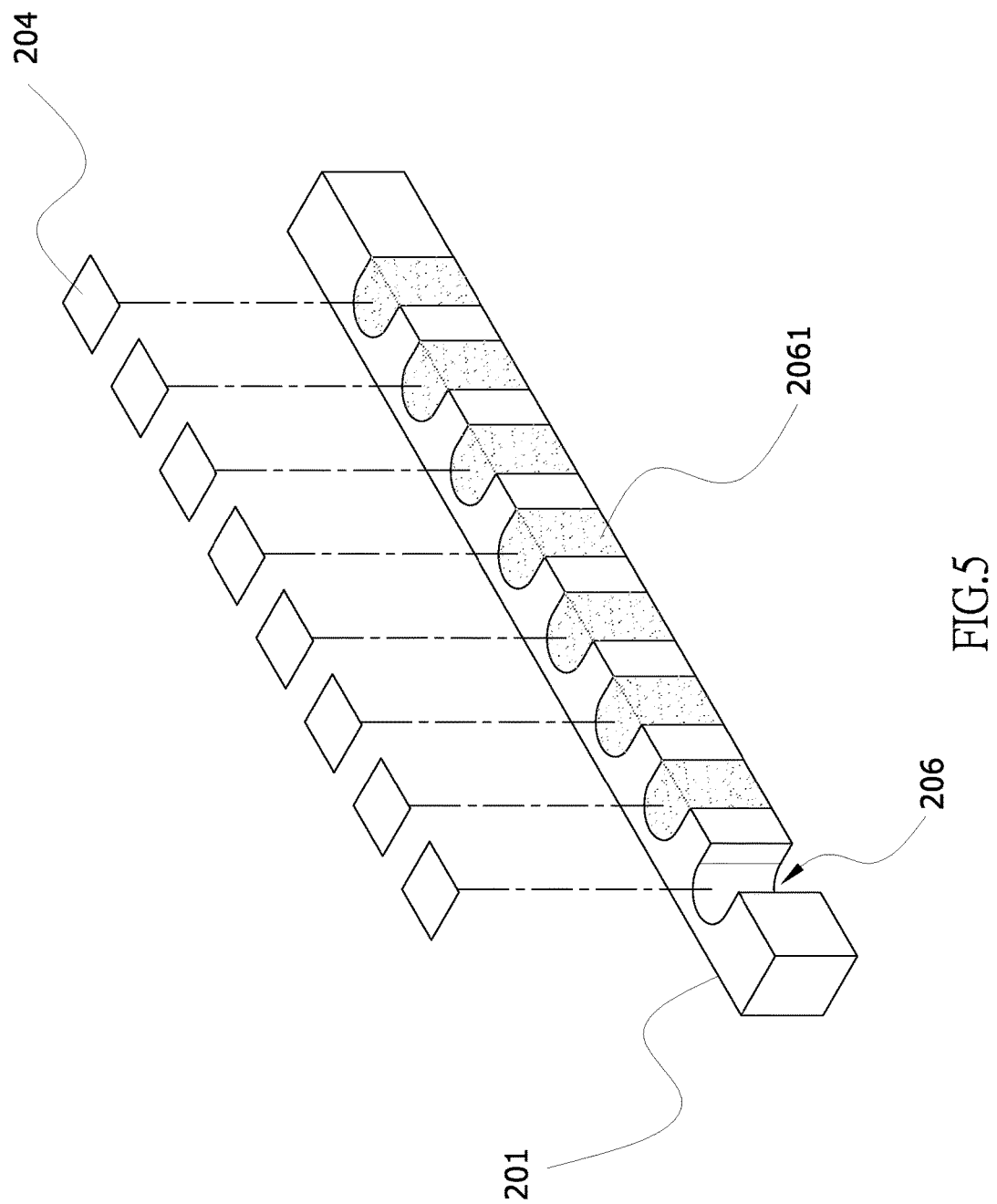
FIG. 5 is a schematic view showing the composition (II) of the present invention.
Figure 6:
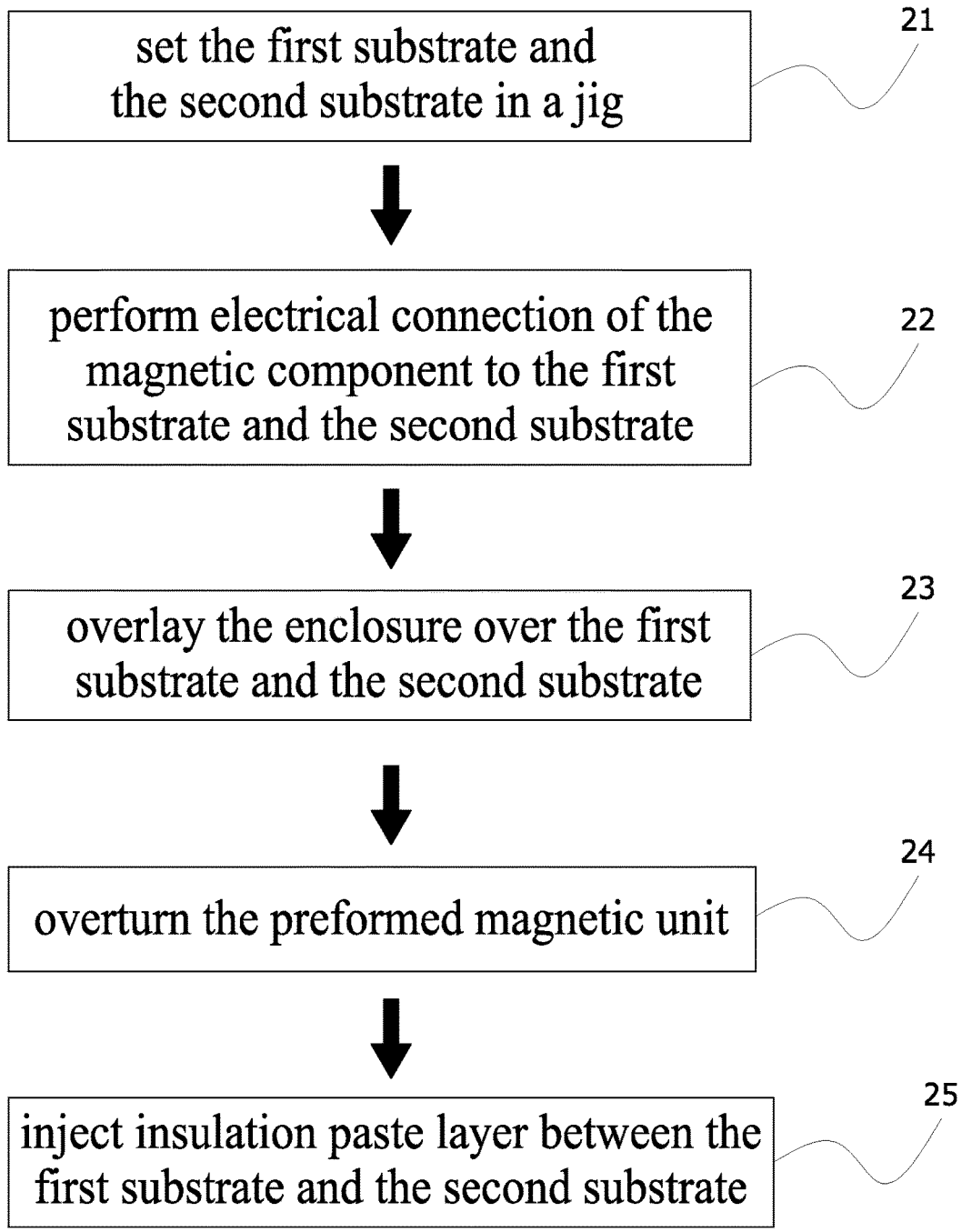
FIG. 6 is a flow chart diagram view showing the implementation of the present invention.
Figure 7:
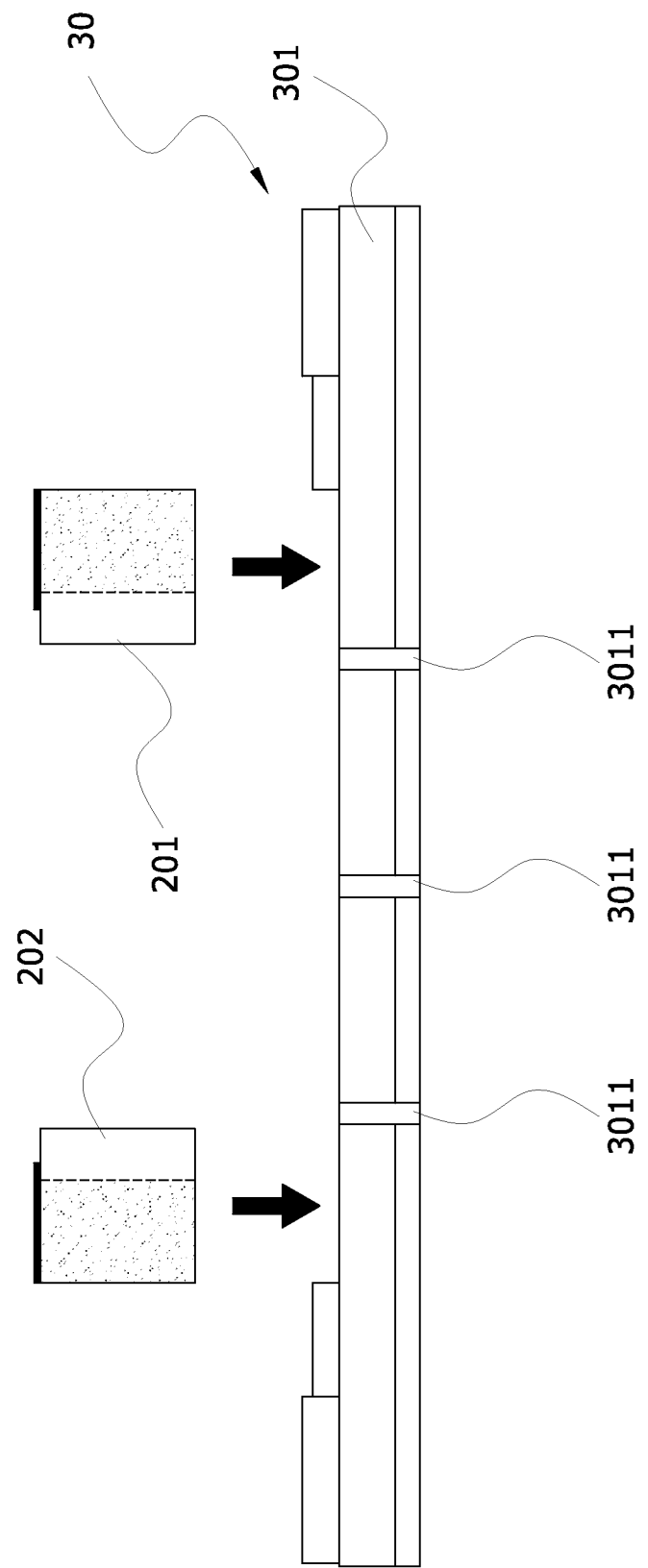
FIG. 7 is a schematic view showing the implementation (I) of the present invention.
Figure 8:
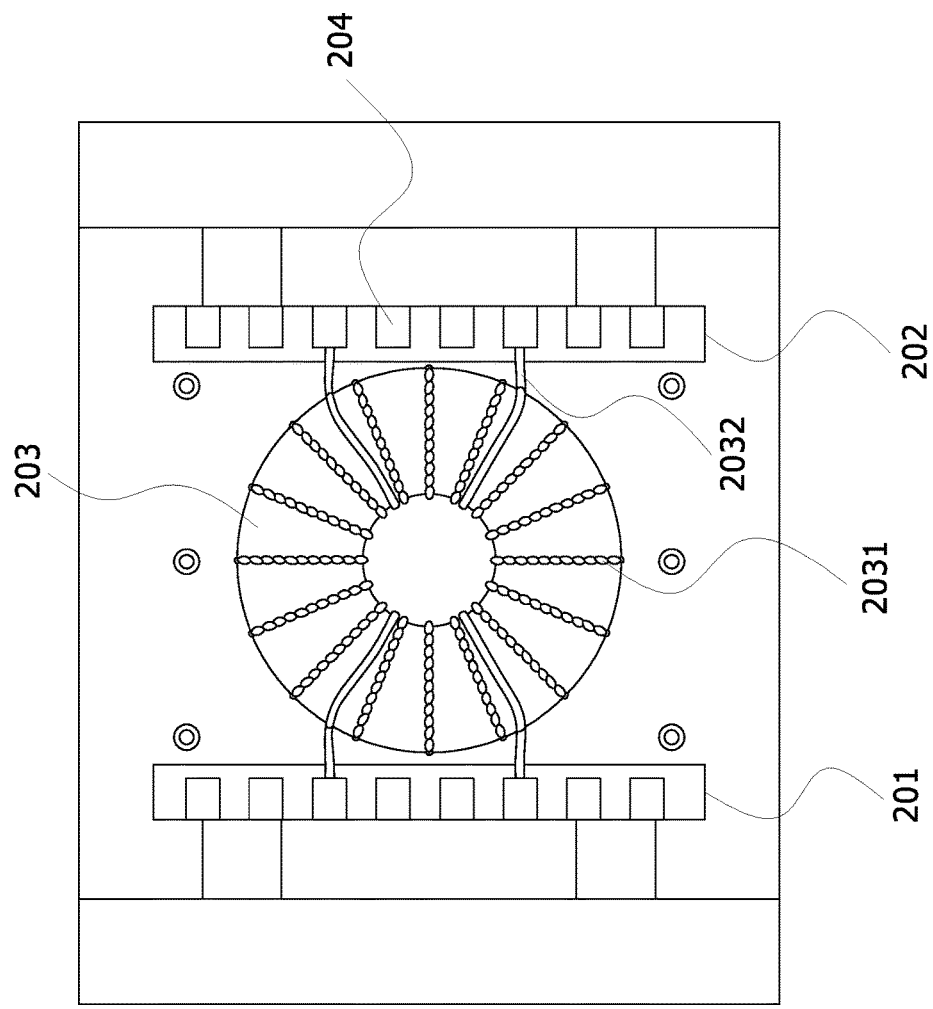
FIG. 8 is a schematic view showing the implementation (II) of the present invention.
Figure 9:
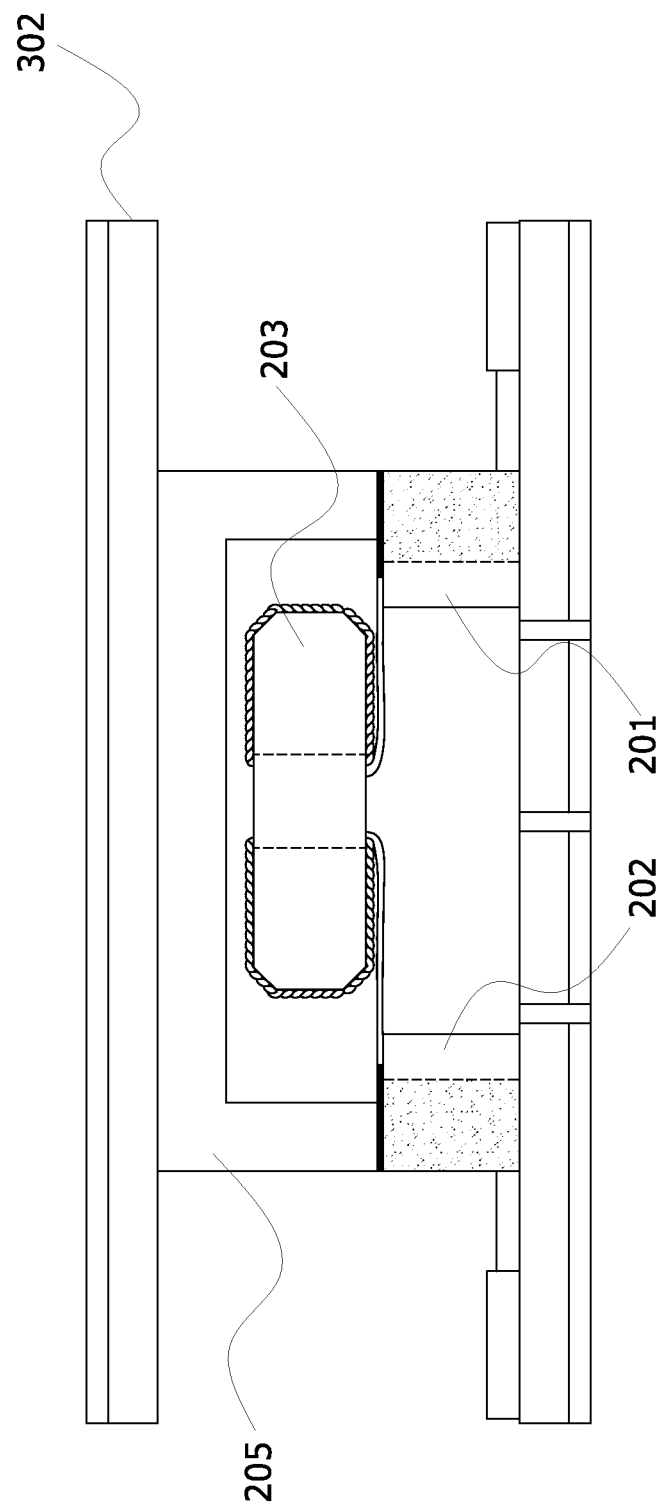
FIG. 9 is a schematic view showing the implementation (III) of the present invention.
Figure 10:
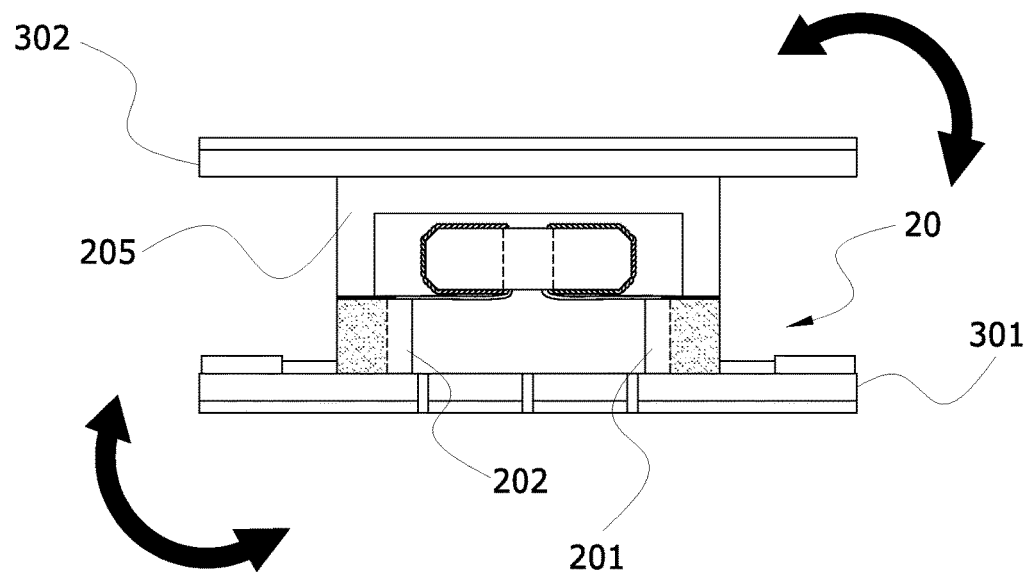
FIG. 10 is a schematic view showing the implementation (IV) of the present invention.
Figure 10:
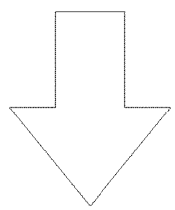
Figure 10:
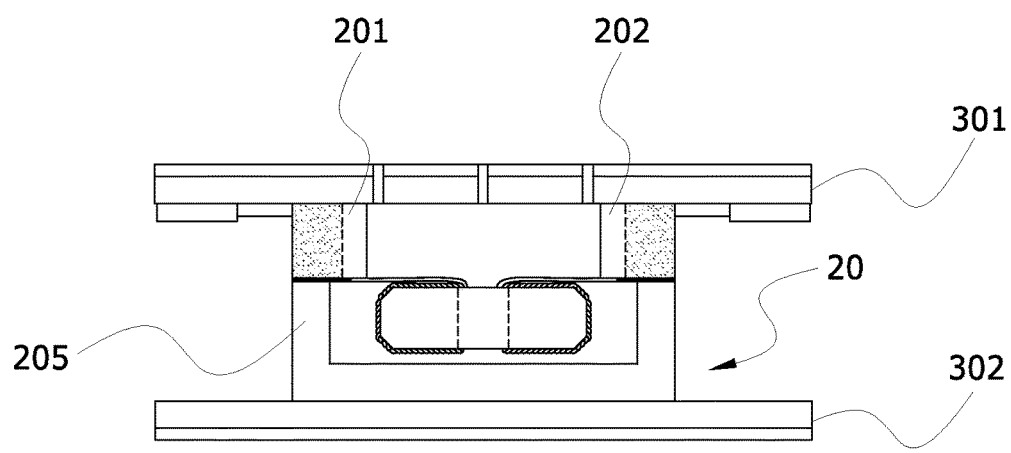
Figure 11:
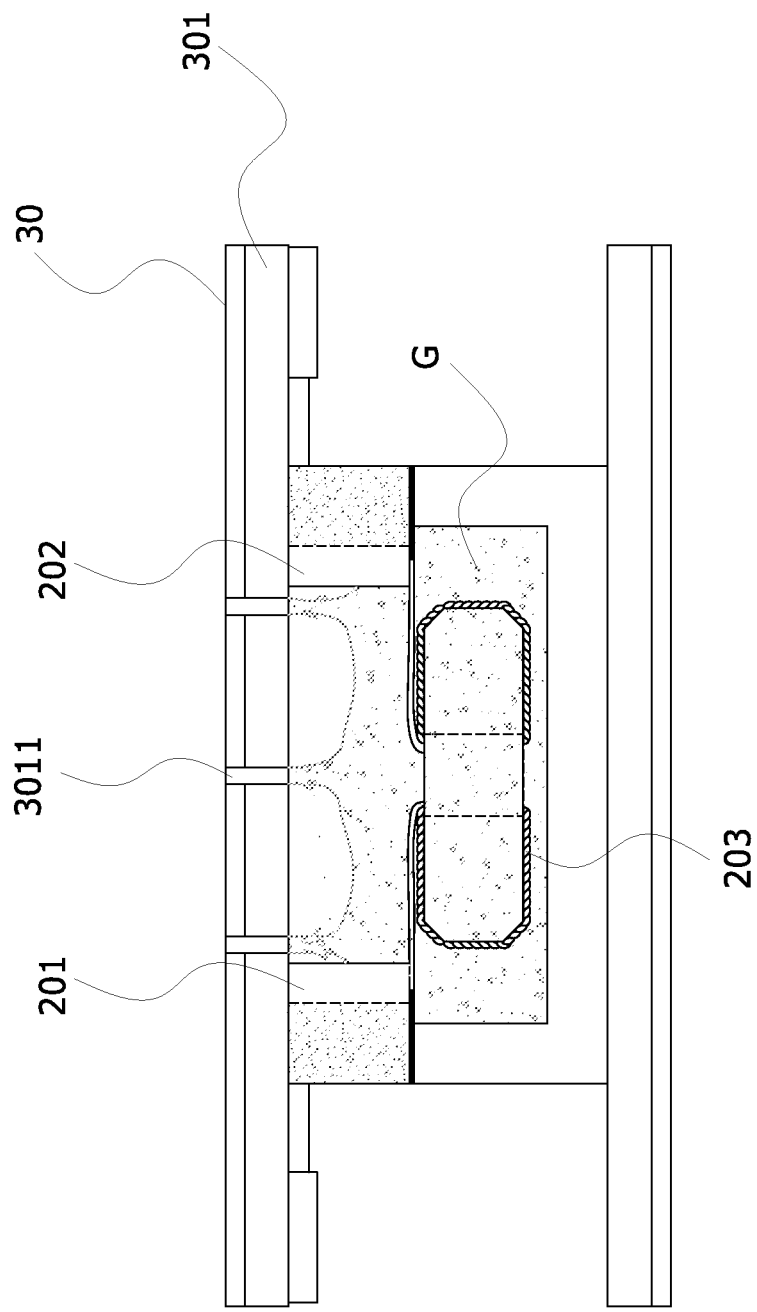
FIG. 11 is a schematic view showing the implementation (V) of the present invention.

Referring to FIGS. 4 and 5, the side edge of anyone of the substrates (the first substrate 201 or the second substrate 202) is breached to form one or a plurality of guide groove(s) 206, and conductive metal(s) 2061 is filled in each of the guide grooves 206 in such a manner that the conductive metals 2061 are exposed externally to the side edge of each of the substrates (the first substrate 201, the second substrate 202). The first electrodes 204 are disposed above the substrate (the first substrate 201, the second substrate 202) and are electrically connected with the conductive metals 2061.

Referring to FIG. 6 and FIGS. 7 to 11, the packaging steps of the present invention is set forth below:
(1) Step 21: set the first substrate and the second substrate in a jig
Referring to FIG. 7, the first substrate 201 and the second substrate 202 are disposed on a first fixed die 301 of a jig 30, and the two substrates (the first substrate 201, the second substrate 202) are spaced with a suitable interval. The first fixing die 301 is formed with a plurality of paste injection portion 3011 through which the insulation paste can be injected in between the first substrate 201 and the second substrate 202;
(2) Step 22: perform electrical connection of the magnetic component to the first substrate and the second substrate
Referring to FIG. 8, the magnetic component 203 is firstly disposed between the first substrate 201 and the second substrate 202, then the electrical connection terminals 2032 of the conductive winding 2031 of the magnetic component 203 are attached to the first electrodes 204 so as to accomplish electrical connection between the magnetic component 203 and the first electrodes 204.
(3) Step 23: overlay the enclosure over the first substrate 201 and the second substrate 202
Referring to FIG. 9, both sides of the enclosure 205 are respectively fixed on the first substrate 201 and the second substrate 202 by a second fixing die 302 of the jig 30 in such a manner that the enclosure 205 is completely overlay the magnetic component 203;
(4) Step 24: overturn the preformed magnetic assembly
Referring to FIG. 10, the first fixing die 301 and the second fixing die 302 are overturned horizontally. After overturning is finished, the enclosure 205 and the two substrates (201, 202) interchange their position;
(5) Step 25: inject insulation paste layer between the first substrate 201 and the second substrate 202
Referring to FIG. 11, bringing forward from above step, the jig 30 injects an insulation paste layer G between the first substrate 201 and the second substrate 202 through each of the paste injection portions 3011 of the first fixing die 301, so that the magnetic component 203 is overcoated by the insulation paste layer G and is firmly fixed on the first substrate 201 and the second substrate 202.

Figure 12:
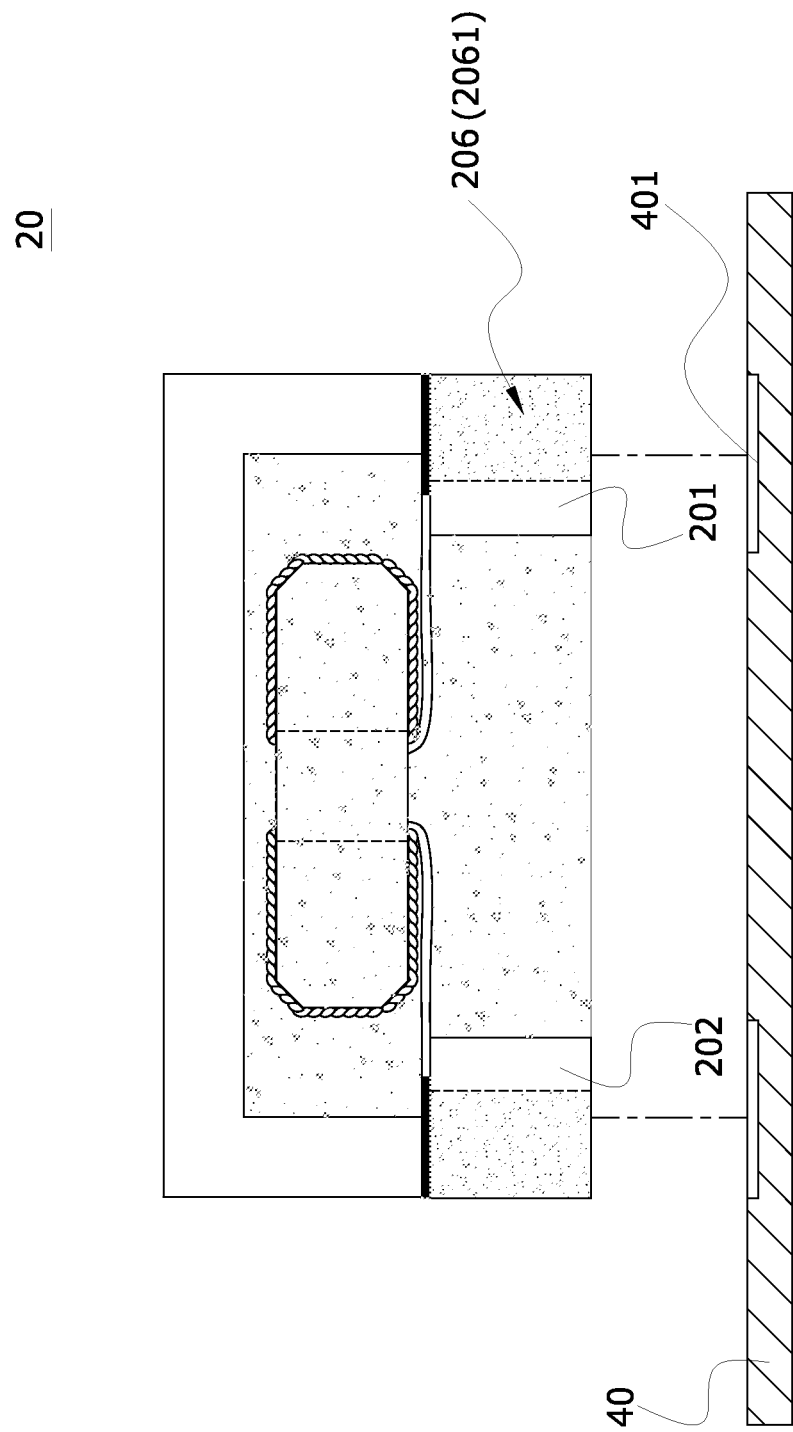
FIG. 12 is a schematic view showing the implementation (VI) of the present invention.
Figure 13:
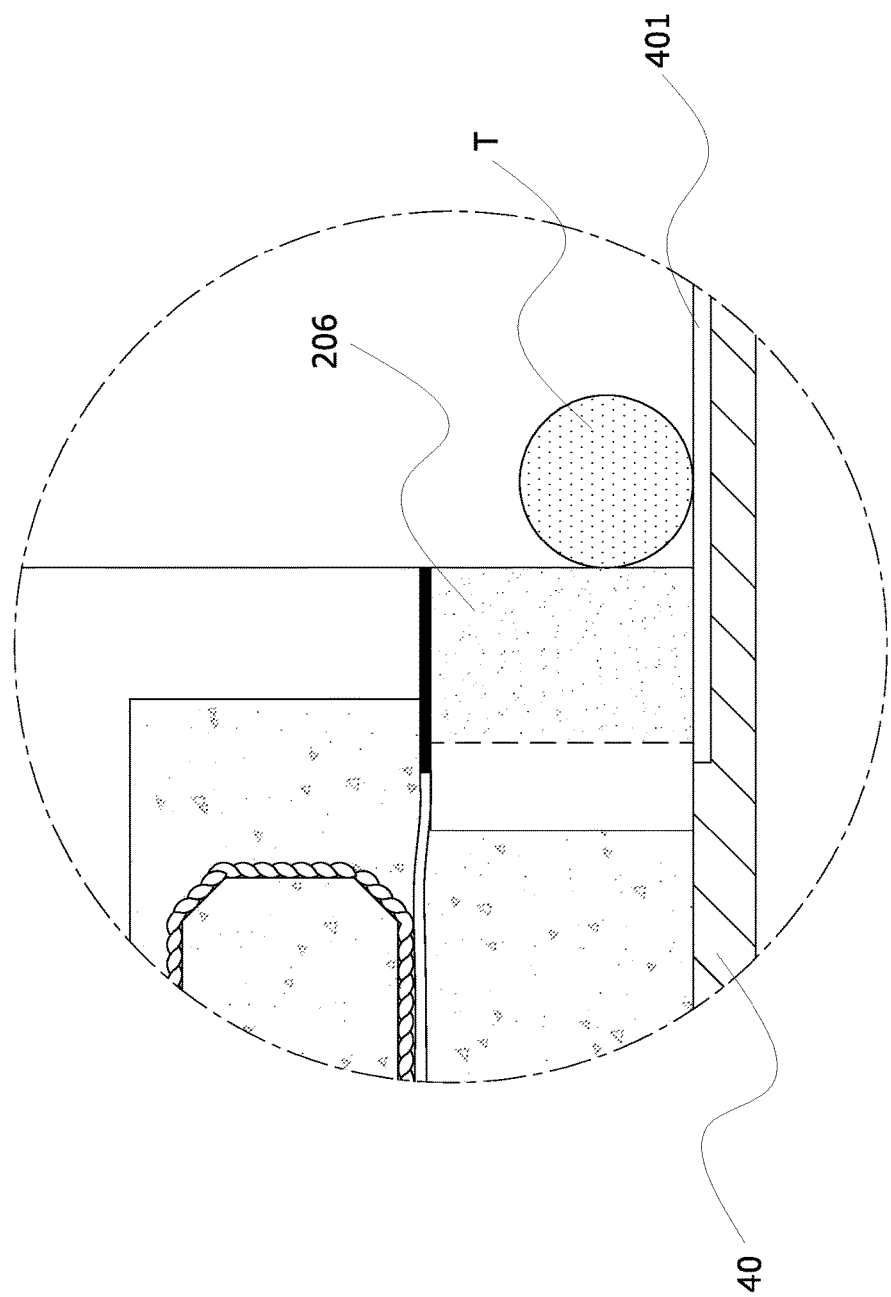
FIG. 13 is a schematic view showing the implementation (VII) of the present invention.
Figure 14:
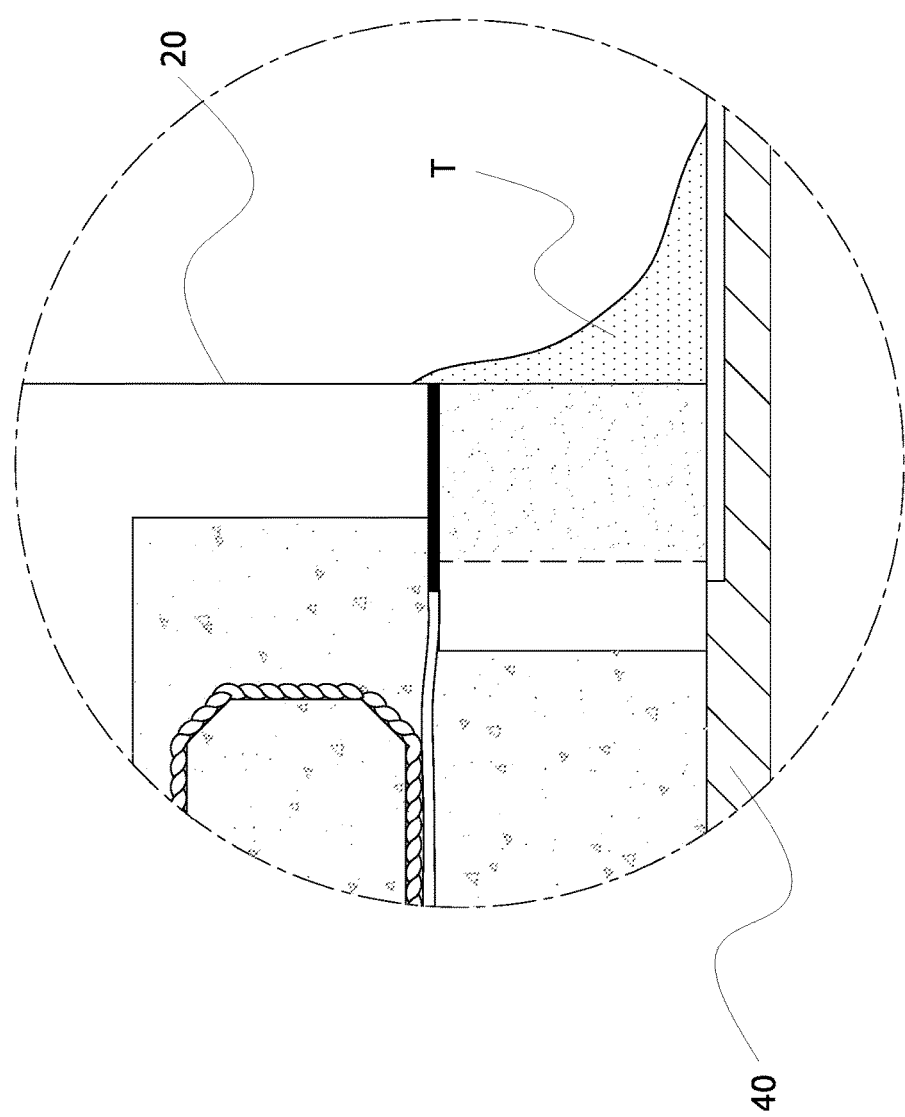
FIG. 14 is a schematic view showing the implementation (VIII) of the present invention.

Referring to FIG. 12, when the magnetic assembly 20 is loaded for PCBA by SMT process, the conductive metals 2061 on the side portion of each of the two substrate (201, 202) are respectively aligned with the electrical connection portions 401. Referring to FIG. 13, after the above steps are finished, a solder liquid T is used to bond the joints of the conductive metals 2061 and the electrical connection portions 401. Also referring to FIG. 14, when the solder liquid T is attached to the joints of the conductive metals 2061 and the electrical connection portions 401, solder wicking phenomenon produced in soldering liquid T enables electrical connection between the conductive metals 2061 and the electrical connection portions 401. Further, the magnetic assembly 20 can also be soldered firmly on the circuit board 40 through the attachment of the soldering liquid T. Furthermore, as more contact areas are formed between the conductive metals 2061 and the electrical connection portions 401, better conductivity is produced between the conductive metals 2061 and the electrical connection portions 401.

Figure 15:
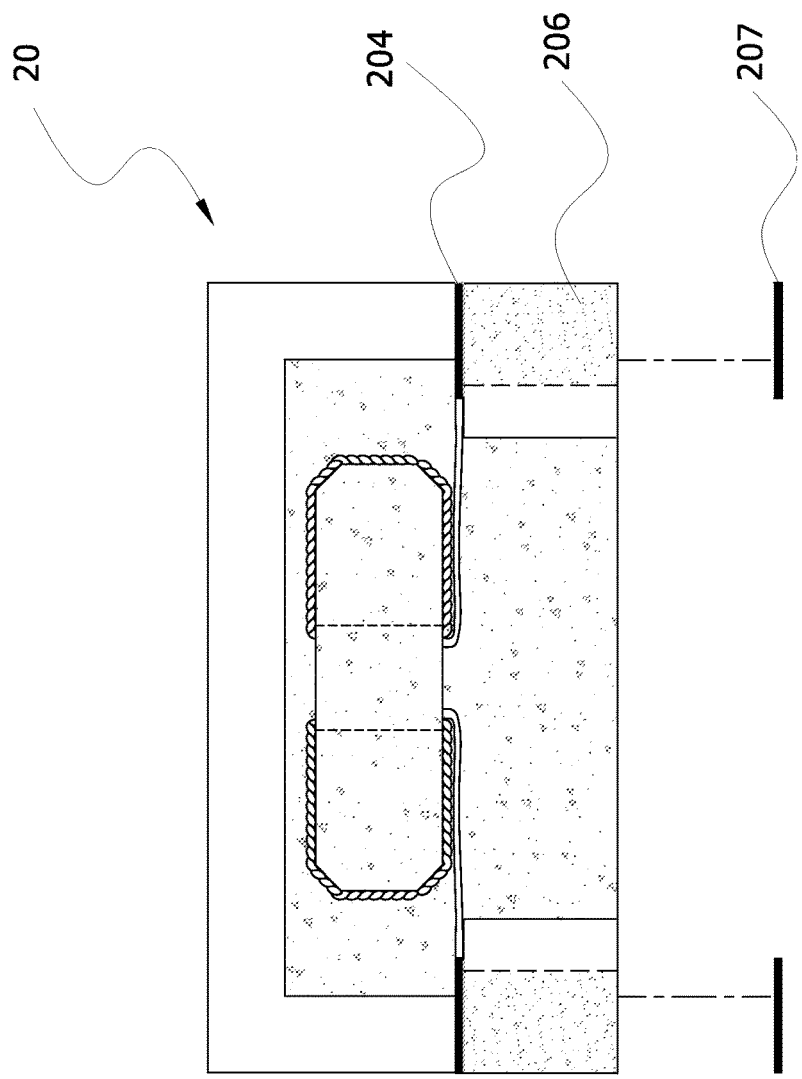
FIG. 15 is another embodiment of the present invention.
Figure 16:
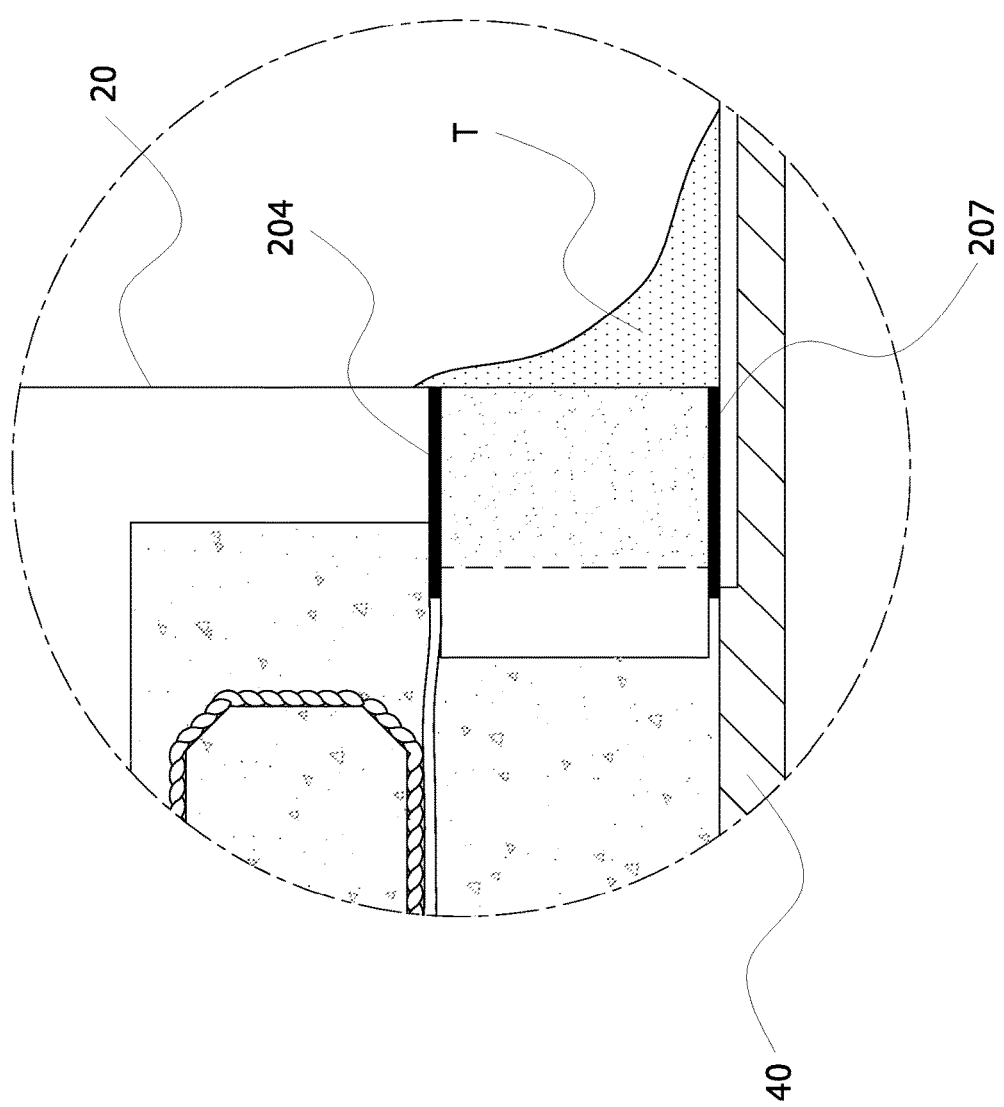
FIG. 16 is a schematic view showing the implementation of another embodiment of the present invention.

Referring to FIG. 15, besides one plane of each of the guide grooves 206 of the magnetic assembly 20 is electrically connected with the first electrode 204; the other plane opposite to the one plane can also be electrically connected with a second electrode 207 which is electrically connected with the first electrode 204. Referring to FIG. 16, in PCBA operation, the solder liquid T can come into contact not only with the grooves 206 but also with the second electrodes 207, so that the magnetic assembly 20 can be adhered more firmly on the circuit board 40. Furthermore, the contact areas are also expanded to increase conductive areas so that conductivity between the magnetic assembly 20 and the circuit board 40 can be effectively enhanced.

Figure 17:
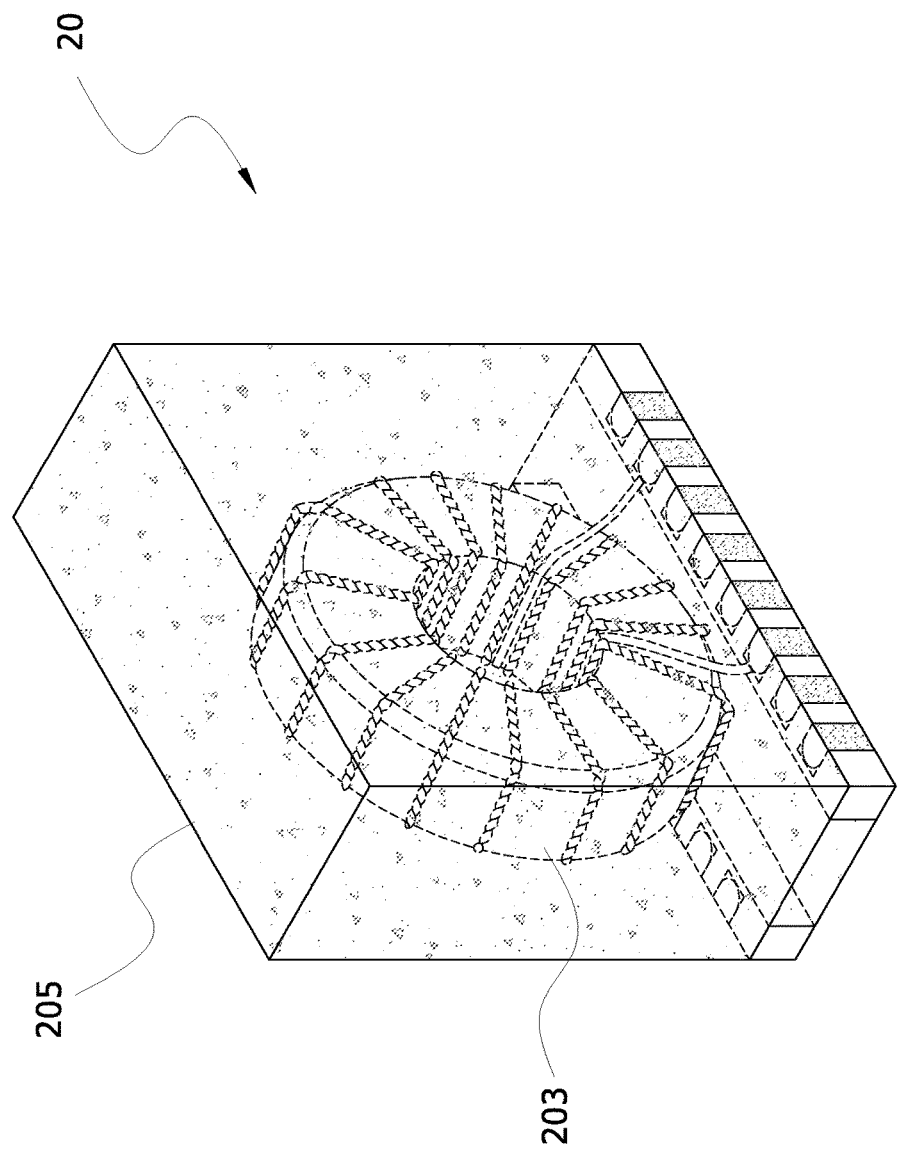
FIG. 17 is a still another embodiment (II) of the present invention.

Referring to FIG. 17, in addition to the above aspect, the magnetic component 203 can also be assembled in vertical manner. In this case, the enclosure 205 having a height corresponding to the vertical height of the magnetic component 203 can be selected so that the enclosure 205 can fully overlay the magnetic component 203. In this manner, the magnetic assembly 20 can miniaturize its overall area such that it can be disposed in narrow circuit environment. Therefore, this embodiment of the present invention can increase diversification of circuit design and shrink overall dimension of the circuit after implementation.

Summing up above, the present invention can save raw material for manufacturing and its structure can cope with market demand to reach miniaturization. Further, during the PCBA of SMT operation of the magnetic assembly, the conductive metals filled in the guide grooves of breach type can provide bigger attachment area for solder liquid. Not only the magnetic assembly can be fixed firmly on the circuit board but also the conductivity of the magnetic assembly can be further increased. Accordingly, the present invention implemented in this manner can achieve the object of providing a magnetic assembly which can save substrate area so as to reduce product dimension and has the effect of easy loading for PCBA by SMT process.

While the present invention has been described by preferred embodiments in conjunction with accompanying drawings, it should be understood the embodiments and the drawings are merely for descriptive and illustrative purpose, not intended for restriction of the scope of the present invention. Equivalent variations and modifications conducted by persons skilled in the art without departing from the spirit and scope of the present invention should be considered to be still within the scope of the present invention.

The invention claimed is:

1. A magnetic assembly packaging process, the magnetic assembly for electrically assembled on a circuit board, the process comprising:
    disposing two elongate type substrates on a first fixed die of a jig and spacing said two elongate type substrates with an interval;
    disposing a magnetic component between said two elongate type substrates, then electrically connecting a conductive winding, which is wrapped around said magnetic component, with a first electrode, which forms at one plane of each of said two elongate type substrates;
    fixing both sides of an enclosure on the said two elongate type substrates respectively by a second fixing die of the jig, so that said enclosure completely overlays said magnetic component;
    overturning the first fixing die and the second fixing die horizontally, then the enclosure and said two elongate type substrates interchange their position after the overturning is finished; and
    injecting an insulation paste layer in between said two elongate type substrates, so that said magnetic component is firmly disposed between said two elongate type substrates by the insulation paste layer.

2. The magnetic assembly packaging process as claimed in claim 1, wherein said first fixing die is formed with a plurality of paste injection portion through which the insulation paste can be injected in between said two elongate type substrates.

3. The magnetic assembly packaging process as claimed in claim 1, wherein one end edge of each of said two elongate type substrates forms a plurality of guide grooves, each of said guide grooves being filled with conductive metal which is exposed externally on the side edge of each of said two elongate type substrates, and one plane of each of said two elongate type substrates has a first electrode electrically connected with said guide groove respectively.

4. The magnetic assembly packaging process as claimed in claim 3, wherein another plane of each of said two elongate type substrates has a second electrode to be electrically connected with said conductive metal.

5. The magnetic assembly packaging process as claimed in claim 1, wherein said magnetic component is disposed between said two elongate type substrates in horizontal manner.

6. The magnetic assembly packaging process as claimed in claim 1, wherein said magnetic component is disposed between said two elongate type substrates in a vertical manner.

* * * * *